United States Patent
Zakkam et al.

(10) Patent No.: US 10,402,768 B2
(45) Date of Patent: Sep. 3, 2019

(54) BUSINESS PROBLEM NETWORKING SYSTEM AND TOOL

(71) Applicant: MuSigma Business Solutions Pvt. Ltd., Bangalore (IN)

(72) Inventors: Naveen David Zakkam, Bangalore (IN); Pranay Raicha, North Chicago, IL (US); Arpit Bajpai, Kanpur (IN)

(73) Assignee: MU SIGMA BUSINESS SOLUTIONS PVT. LTD., Bengaluru (IN)

( * ) Notice: Subject to any disclaimer, the term of this patent is extended or adjusted under 35 U.S.C. 154(b) by 774 days.

(21) Appl. No.: 14/576,061

(22) Filed: Dec. 18, 2014

(65) Prior Publication Data
US 2015/0332185 A1   Nov. 19, 2015

(30) Foreign Application Priority Data

May 19, 2014   (IN) ............................ 2495/CHE/2014

(51) Int. Cl.
*G06Q 10/06*   (2012.01)
(52) U.S. Cl.
CPC ................................ *G06Q 10/0637* (2013.01)
(58) Field of Classification Search
CPC .................................................... G06Q 10/06
See application file for complete search history.

(56) References Cited

U.S. PATENT DOCUMENTS

| | | | | |
|---|---|---|---|---|
| 6,510,406 | B1* | 1/2003 | Marchisio | G06F 17/2715 704/9 |
| 6,611,825 | B1* | 8/2003 | Billheimer | G06F 17/30616 382/156 |
| 9,589,051 | B2* | 3/2017 | Bergstrom | G06F 17/30728 |
| 2002/0111817 | A1* | 8/2002 | Cronin | G06Q 10/10 705/310 |
| 2007/0136276 | A1* | 6/2007 | Vella | G06F 17/30867 |
| 2007/0239778 | A1* | 10/2007 | Gallagher | G06F 17/30244 |
| 2010/0262576 | A1* | 10/2010 | Stockwell | G06F 17/2785 706/55 |
| 2012/0066547 | A1* | 3/2012 | Gilbert | H04L 41/065 714/26 |

(Continued)

*Primary Examiner* — Kurtis Gills
(74) *Attorney, Agent, or Firm* — Harness, Dickey & Pierce, P.L.C.

(57) ABSTRACT

A system for identifying and visualizing one or more interrelationships occurring amongst a plurality of business problems is provided. The system includes a business problem repository configured to store a plurality of business problem statements. Each business problem statement includes a plurality of components. The system also includes a connection engine coupled to the business problem repository and configured to determine one or more connections for the plurality of business problem statements by applying a one-to-one comparison scheme that is configured to generate a connection score for each comparison. The system further includes a connections repository coupled to the connection engine and configured to store the plurality of connections and corresponding connection scores. Further, a visualization engine is coupled to the connections repository and configured to generate a business problem network. The business problem network includes nodes and connections, each node representing a single business problem statement.

14 Claims, 13 Drawing Sheets

(56) References Cited

U.S. PATENT DOCUMENTS

2013/0198186 A1* 8/2013 Parakhin ........... G06F 17/30979
 707/737
2015/0120721 A1* 4/2015 Kim .................... G06F 17/3053
 707/728

* cited by examiner

| Library 152 | | | | | | | | |
|---|---|---|---|---|---|---|---|---|
| Import  154   Export  156  New 158 | | | Create 160 | Categorize | Delete | Column Visibility | Create Library 180 | |
| Business Problem Statement ▼ | Vertical ▼ | Horizontal ▼ | Problem Type ▼ | Business Type ▼ | Custom Category ▼ | Created By ▼ | Created On ▼ | Modified |
| ☐ 5069-Retail-Service and Sup... | Consumer Packaged Goods (CPG), Retail | Strategy & Planning, Finance | Cost-Benefit Analysis, Resource Optimization, Design of Experiments | Business to Business, Business to Consumers, Online | | Akansha.Ch | 11/11/2013 | 11/11/2 |
| ☐ 0017 - Banking - Marketing - i... | Banking | Marketing | Customer churn analysis, Acquisition | Business to Business | retention, attrition, attriting model, Customer satisfaction | Debleena.M | 09/19/2013 | 09/19/2 |
| ☐ 1562 - BFS - Risk Manageme... | Banking | Risk management | Loss Modeling | Business to Business, Business to Consumers, | Mortgage, Liquidity Non performing loans | Varun.Gupta | 10/14/2013 | 10/14/2 |
| ☐ 1563 - Multiple - Risk - Sound... | Finacial Services | Strategy & Planning | Identification of high risk cases for preventive | Business to Business | management, default risk, risk model, Products | Harish.Ns1 | 10/21/2013 | 10/21/2 |
| 162 | 168 | 170 | 172 | 174 | 176 | 178 | 164 | 166 |

FIG. 10

BUSINESS PROBLEM NETWORKING SYSTEM AND TOOL

BACKGROUND

The invention relates generally to statistical systems and tools, and more particularly to a system and tool for networking of business problem definitions.

The usage of networks to depict interconnections along with visualization is well known. Various usage areas of networks include social network analysis, cartography, mathematics, computer networks, information systems, logistics, supply chain management, operations research and the like. For example, in bioinformatics, networks are often used to identify interactions across molecules.

Several tools are available that enable visualization of networks and provide users the ability to visualize interaction amongst individual components in the network. Examples of network visualization techniques include force based layouts, spectral layouts, orthogonal layouts, tree layouts, layered graph drawing methods, arc diagrams, circular layouts and dominance drawing methods etc.

However, the above mentioned techniques have not been utilized in the field of problems related to business organizations. One reason for limited application in business problems could be the complexity in identifying the inter-relation between multi-dimensional problems. Further, identifying a relative importance of a problem compared to other existing problem can be quite complex.

Therefore, there is a need to identify the relevancy of a problem along with its relations to the adjoining problems in a given problem space and to facilitate identification of new opportunities for business using a systematic approach.

SUMMARY

Briefly, according to one aspect of the invention, a system for identifying and visualizing one or more interrelationships occurring amongst a plurality of business problems is provided. The system includes a business problem repository configured to store a plurality of business problem statements. Each business problem statement includes a plurality of components. The system also includes a connection engine coupled to the business problem repository and configured to determine one or more connections for the plurality of business problem statements by applying a one-to-one comparison scheme. The one-to-one comparison scheme is configured to generate a connection score for each comparison. The system further includes a connections repository coupled to the connection engine and configured to store the plurality of connections and corresponding connection scores and a visualization engine coupled to the connections repository and configured to generate a business problem network. The business problem network includes a plurality of nodes, each node representing a single business problem statement. The plurality of nodes is coupled to each other using the plurality of connections.

In accordance with another aspect, a business problem networking tool for identifying and visualizing one or more interrelationships occurring amongst a plurality of business problems is provided. The business problem networking tool includes an interactive user interface configured to enable a user to select a business problem statement from a business problem network. The business problem networking tool also includes a filter interface configured to enable the user to filter the plurality of business problem statements based on one or more parameters. The business problem networking tool further includes a library configured to enable the user to search the plurality of business problem statements based on search string.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 10 is an example user interface depicting a library of business problem statements that can be accessed by a business problem networking tool implemented according to aspects of the present technique;

DETAILED DESCRIPTION

The present invention provides a business problem networking system and tool configured to identify and visualize one or more interrelationships occurring amongst a plurality of business problem statements. The business problem networking systems and tool are described with example embodiments and drawings. References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
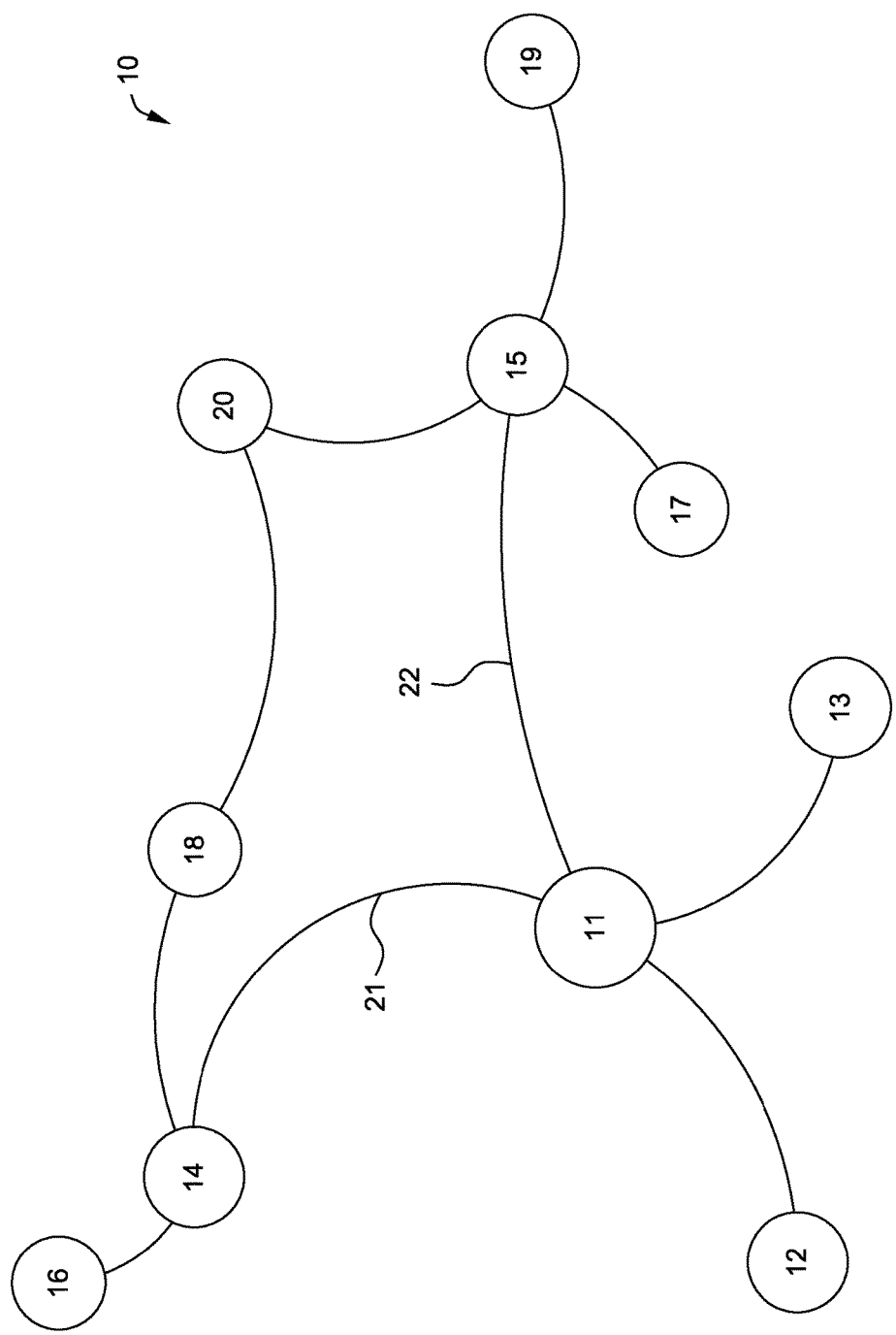
FIG. 1 is an example business problem network comprising nodes and connections implemented according to aspects of the present technique.

FIG. 1 is an example visual representation of a business problem network that is arranged for identifying and visualizing one or more interrelationships occurring amongst multiple business problems in accordance with the present technique. The business problem network 10 includes business problem statements 11 through 20 coupled to each other using a number of connections depicted by reference numerals 21, 22. Examples of business problem statements include causes of revenue leakage, customer buying pattern, impact of price rise on sales, identifying sales drivers and the like.

The connections, such as 21 and 22, connecting the business problem statements are determined using a connection engine (not shown which will be later described in further detail. The connections enable a user to visualize several business problem statements in an interconnected pattern. As used herein, the term "user" may refer to both natural people and other entities that operate as a "user". Examples include corporations, organizations, enterprises, teams, or other group of people. The manner in which the business problem network is generated is described in further detail below.

Figure 2:
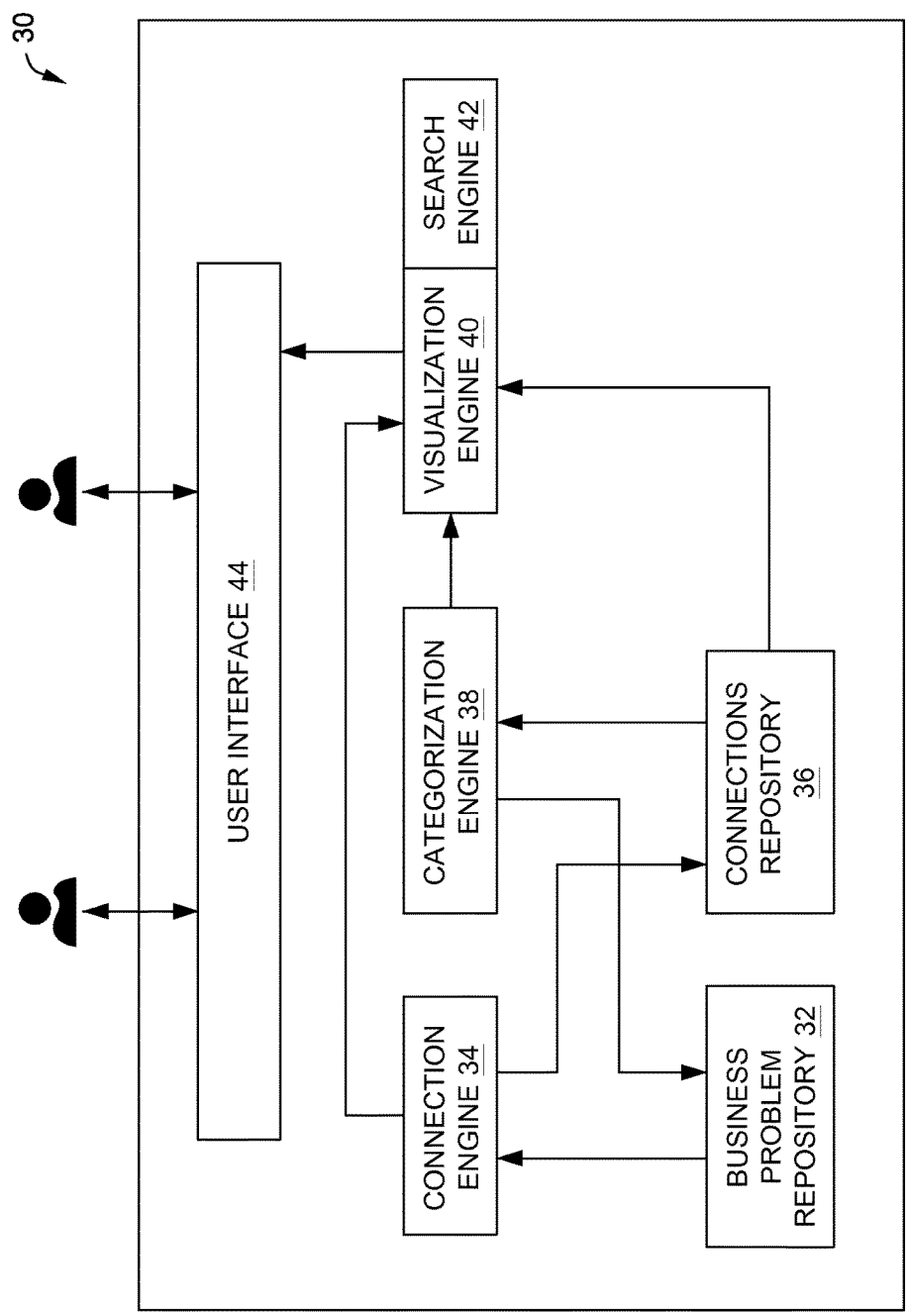
FIG. 2 is a block diagram of one embodiment of a business problem system implemented according to aspects of the present technique.

FIG. 2 is a block diagram of an example business problem system for generating a business problem network implemented according to aspects of the present technique. The business problem system 30 includes a business problem repository 32, a connection engine 34, a connections repository 36, a categorization engine 38, a visualization engine 40, a search engine 42 and a user interface 44. Each component is described in further details below.

Business problem repository 32 is configured to store many business problem statements and associated data. In one embodiment, the business problem statements are uploaded into the business problem repository 32 using a data management system (not shown). One example of a data management system is described in India patent application number 160/CHE/2013 titled "Data Management System and Tool" filed on the 7 of Jan., 2013 and is incorporated herein. Typically, business problem statements include several components such as name, title, description, situation in which the problem occurs, key question related to the problem, complications arising in the problem definition, desired state of the problem, various factors that directly or indirectly contribute to the problem definition, a plurality of hypotheses associated with the problem etc. Each business problem statement is further tagged with details about vertical, horizontal, business type, problem type and other relevant metrics.

Connection engine 34 is coupled to the business problem repository 32 and is configured to identify one or more connections between the business problem statements. In one embodiment, the connection engine 34 is configured to assign a weight for each connection. In addition, the connection engine 34 is configured to assign a direction for each of the connections. In one embodiment, the connections between the business problem statements are generated by comparing the components associated with each business problem statement.

Specifically, in one embodiment, the connection between two business problem statements is generated by applying a one-to-one comparison scheme on the two business problem statements. The one-to-one comparison scheme is configured to generate a connection score for each comparison. In one embodiment, the connection score is determined by comparing the components associated with the business problem statements. Examples of the components considered for comparisons include title, description, tags, factor maps, and other information associated with the business problem statement. The connections generated by the connection engine 34 are stored as one or more connection tables in the connections repository 36.

The connections repository 36 is configured to store the plurality of connections using one or more connection tables. In one embodiment, the connection table comprises a direction and a weight for each connection associated with each business problem statement. In a further embodiment, each connection includes a 'from node' and a 'to node' representing a source node and a destination node for each connection. The connections stored in the connections repository 36 are utilized by the categorization engine 38.

Categorization engine 38 is coupled to the business problem repository 32 and the connections repository 36 and is configured to assign a rank to each business problem statement using the connection tables. The categorization engine 38 is further configured to group the business problem statements into one or more clusters.

The visualization engine 40 is coupled to the business problem repository 32 and the connections repository 36 and is configured to generate a visual representation of the business problem network. In one embodiment, the business problem network includes nodes and connections. Each node in the business problem network represents the business problem statement and the nodes are coupled to each other using connections In one embodiment, the visualization engine 40 is configured to assign the coordinates, color and size to each of the node. In one embodiment, each connection is considered as an edge and is assigned a specific thickness and direction. The visual representation of the business problem network may be explored by one or more users through various functionalities such as mining, viewing, previewing and downloading business problem definition. The visualization engine 40 is further configured to provide several animated views and graphical representations of the business problem network based on user inputs. The visualization engine 40 is further coupled to a search engine 42 configured to search the plurality of business problems statements based on search string provided by the user.

The user interface 44 is configured to display the visual representation of the business problem network comprising nodes and connections. The user interface 44 may include various types of input devices such as keyboards, interactive screens etc. The manner in which the connections are generated is described in further detail below.

Figure 3:
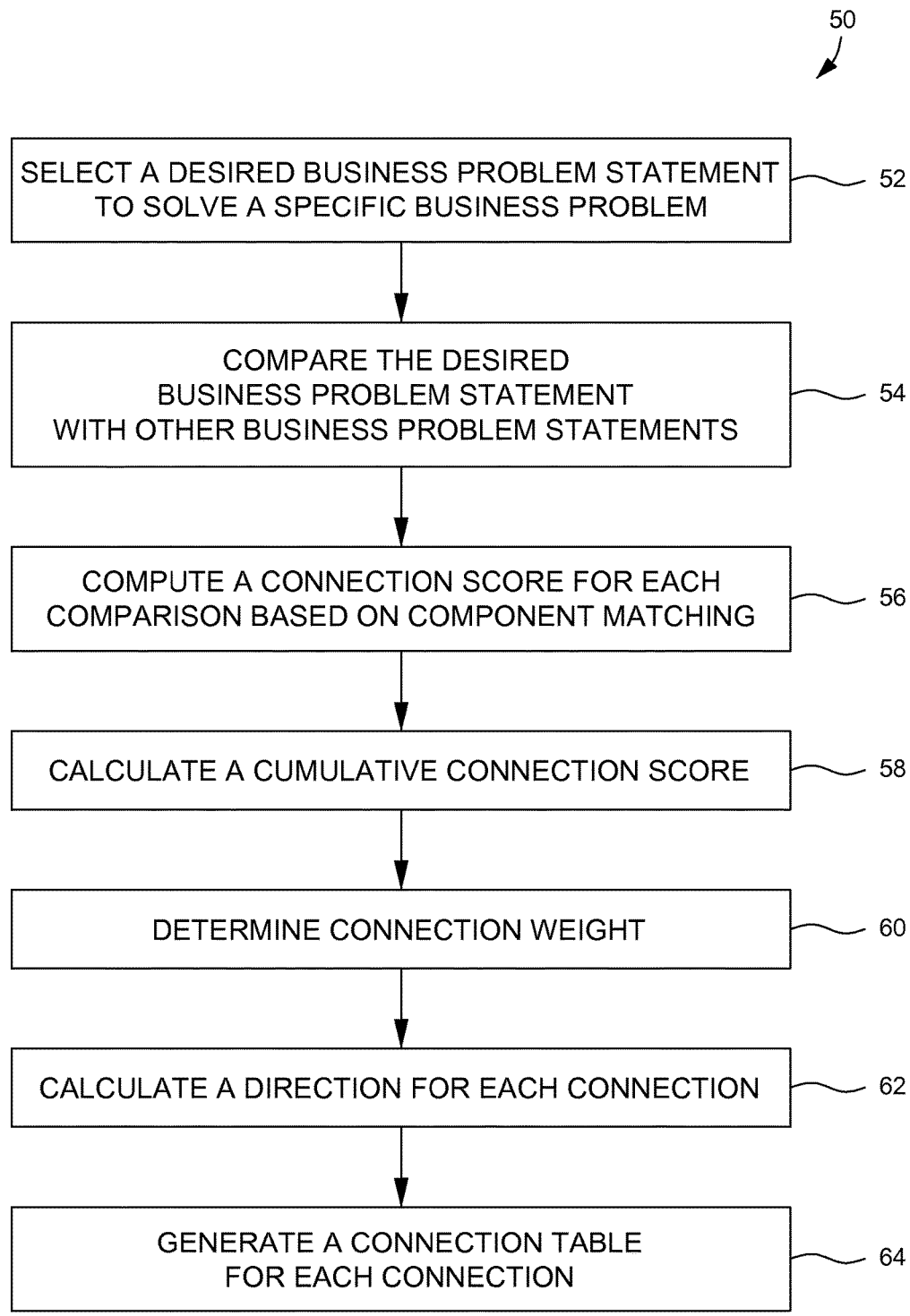
FIG. 3 is an example flow diagram of one method of determining one or more connections for the business problem statements implemented according to aspects of the present technique.

FIG. 3 is an example flow diagram depicting one method to determine one or more connections for the business problem statements implemented according to aspects of the present technique. The business problem statements are stored in a repository as described above. Each step of the process is described in further detail below.

At block 52, a desired business problem statement to solve a specific business problem is selected by a user. It may be noted that the business problem statement is either selected from a set of existing business problem statements or is created and uploaded by the user through a data management system. An example data management system is described in India patent application number 160/CHE/2013 titled "Data Management System and Tool" filed on the 7 of Jan., 2013 and is wholly incorporated herein. In general, the business problem statement may include multiple components such as title of the problem, associated keywords, situation in which the problem occurs, key question related to the problem, complications arising in the problem definition, desired state of the problem, various factors that directly or indirectly contribute to the problem definition, a plurality of hypotheses associated with the problem etc.

At block 54, the desired business problem statement is compared with other business problem statements. In one embodiment, each component of the desired business problem statement is compared with the components of the existing business problem statements. In one embodiment, a one to one matching is performed for each component for every comparison.

At block 56, a connection score is computed for each comparison based on the result of component matching. In one embodiment, the connection score is set to zero at the beginning of each comparison. The connection score is incremented based on the degree of match present between the compared components. The degree of match may depend on various criteria such as number of keywords matching, order of keywords matching, component in which key words are matching and the like.

At block 58, a cumulative connection score is calculated by adding the connection score for each component between the desired business problem statement and other business problem statements. In one embodiment, a higher cumulative connection score between two business problem statements indicate a stronger connection.

At block 60, a connection weight is determined for each connection in the business problem network. In one embodiment, the connection weight is determined as a difference between the connection score and a pre-defined cut off value. The pre-defined cut off value is determined by performing one or more iterations in a heuristic manner and observing the results by choosing various cut off values. Further, a connection flag is set as true when the connection score is more than the pre-defined cut off value.

At block 62, the direction is calculated for each connection. In one embodiment, the direction for a connection between two business problem statements is calculated by comparing the direction of the common components amongst them. In one embodiment, the comparison is performed to identify the nature of relationship existing between the business problem statements. The comparison may also use an offline direction table containing related business metrics and their direction available in the connections repository. Additionally, the comparison may also include other factors such as factors influencing the business goals and metrics used to measure the business goals along with relation to parent business problem statement and other business problem statements.

At block 64, one or more connection tables are generated for each connection by repeating the comparison for every possible pair of components in the business problem statement. The connections table includes details like source problem statement, target problem statement, weight of the connection, direction of connection, etc. The manner in which the connections table is utilized for categorizing the business problem statements is described in further detail below.

Figure 4:
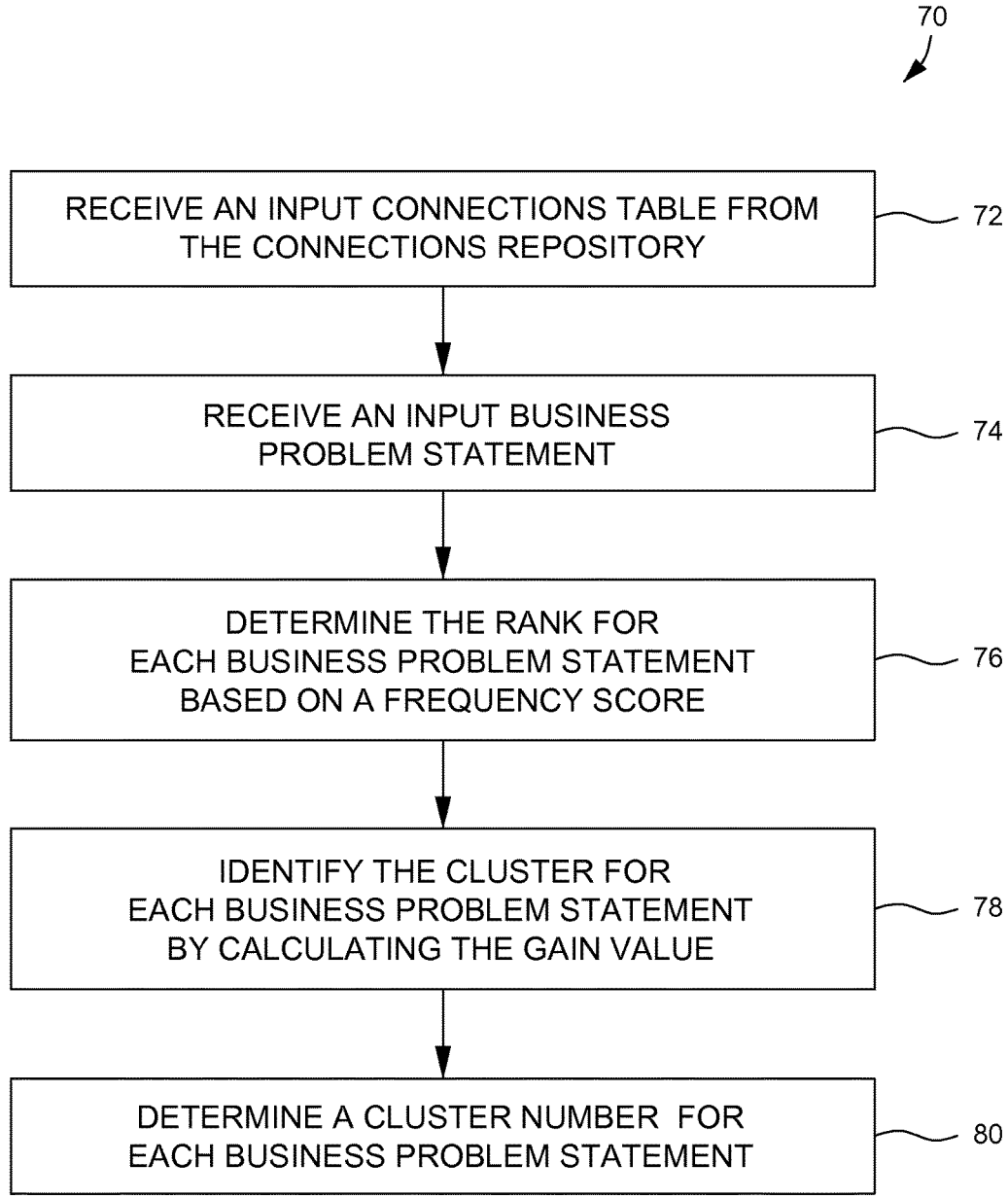
FIG. 4 is an example flow diagram of one method of categorizing a business problem statement into clusters using one or more connection tables implemented according to aspects of the present technique.

FIG. 4 is an example flow diagram describing one method of categorizing a business problem statement into clusters using one or more connection tables implemented according to aspects of the present technique. Each step of the process is described below.

At block 72, the connections table is received from the connections repository. The connections repository includes connections table comprising the direction and weight for each connection associated with each business problem statement. At block 74, the business problem statement stored in the business problem repository is received. The business problem repository stores the business problem definition and associated components.

At block 76, the rank for each business problem statement is determined based on a frequency score. Initially, the frequency score for each business problem statement in the business problem network is set to zero. In one embodiment, the frequency score is calculated by selecting a random business problem statement along with other business problem statements connected to it. Further, a best path such as shortest path is calculated from the selected business problem statement to each of the other related business problem statement based on connections list, strength of each connection, direction of each connection. The frequency score for all the business problem statement participating in the established best path is incremented. The calculation is repeated for all the business problem statements available in the business problem repository. In one embodiment, the frequency scores are normalized to assign the rank to each business problem statement after all frequency scores are calculated for the business problem statements.

At block 78, a cluster is identified for each of business problem statement by calculating a cluster value and a gain value. In one embodiment, each business problem statement is considered to belong to a different cluster. In a recursive manner, every business problem statement is assumed to be merged to adjacent cluster. The gain value is determined using a cluster value as a difference between the new cluster value and the existing cluster value. The business problem statement is merged to the new cluster having a highest positive gain value.

The new cluster value is determined based on sum of weight of all the business problem statements inside the joining cluster, sum of weights of the incident edges from leaving business problem statement to the joining cluster, total incident weights on the joining cluster, total weight of the business problem network, and total weight incident on the leaving business problem statement.

Similarly, the existing cluster value is determined based on sum of weight of all nodes inside the joining cluster, sum of weight of incident connection on the joining cluster, total weight incident on the leaving business problem statement and total weight of the business problem network.

At block 80, a cluster number is determined for each business problem statement. The cluster number is determined by repeating the step of merging all the business problem statements to new clusters until a negative gain value is encountered. The manner in which the rank and cluster for the business problem statement is utilized to generate a business problem network is described in further detail below.

Figure 5:
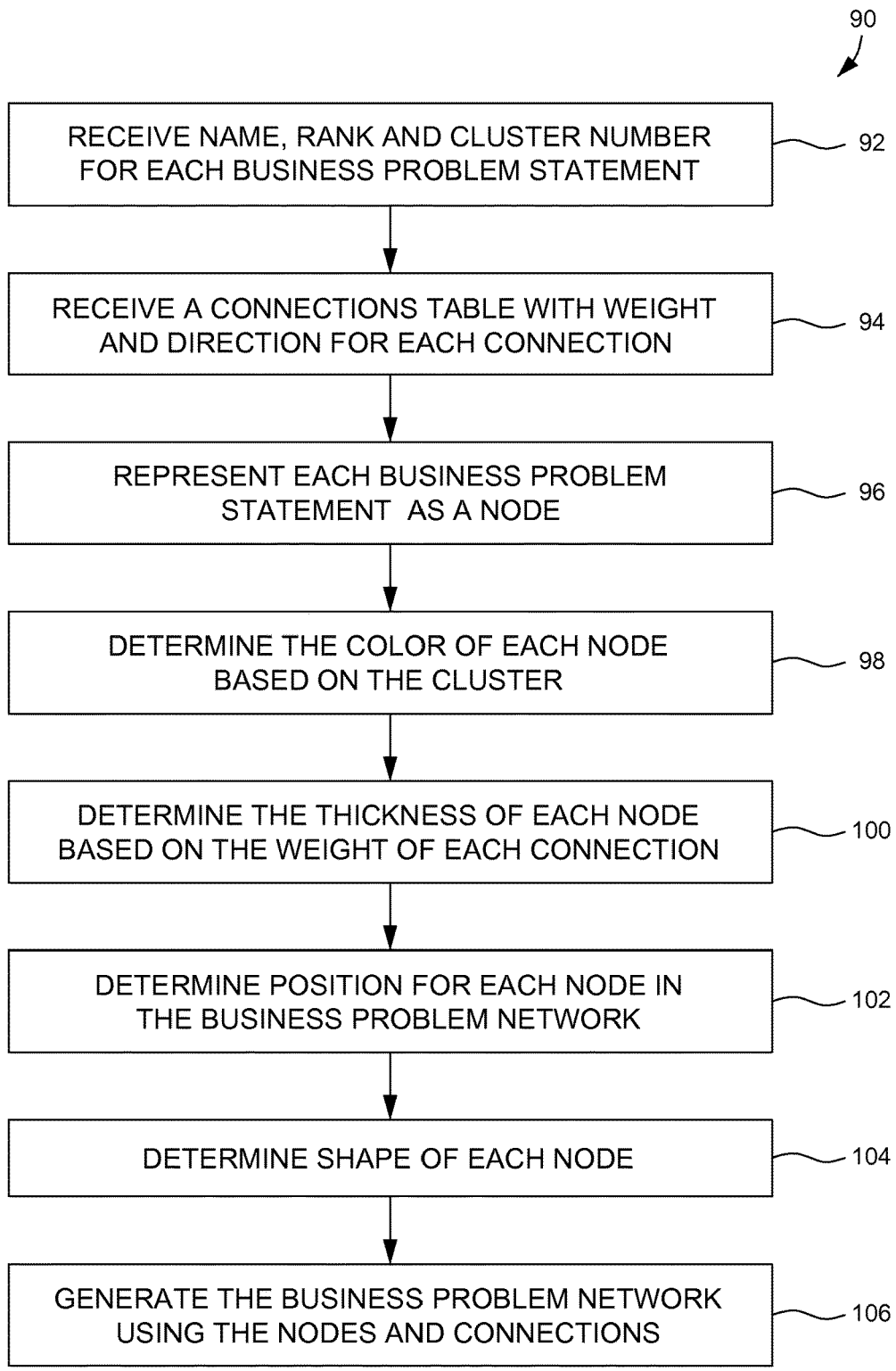
FIG. 5 is an example flow diagram of one method to generate a business problem network using nodes and connections implemented according to aspects of the present technique.

FIG. 5 is an example flow diagram of one method to generate a business problem network using the nodes and connections implemented according to aspects of the present technique. Each step of the process is described below.

At block 92, a name, rank and cluster number for each business problem statement is received. The details about each of the business problem statement are received from the business problem repository.

At block 94, one or more connection tables with weight and direction for each connection is received. In one embodiment, the connection table is obtained from the connections repository which stores the weight and direction for each connection associated with each business problem statement.

At block 96, each business problem statement is represented as a node. In one embodiment, a size of each node is determined based on the rank of the business problem statement. In one embodiment, the node with the lowest rank is allotted the size of 4 points and the nodes with the highest rank are allotted the size of 10 points. Other node sizes are set based on their rank so as to lie between these two numbers.

At block 98, a color for each node is determined based on the cluster that it belongs to. In one embodiment, the color of the edges is chosen to be same as the color of the node it originates from. The color is chosen to ensure that the contrast across clusters is significant. The colors are chosen from specific section of the color wheel. In this embodiment, the first eight cluster colors are chosen from the color wheel. These colors are represented in the form of hue, saturation and lightness (HSL). For relatively higher number of clusters, these eight colors are modified by adding more lightness to the HSL numbers.

At block 100, a thickness of each node is determined based on the weight of each connection. In one embodiment, the connection with the minimum weight is allotted a thickness of 1 point and the connection with the maximum weight is allotted a thickness of 5 points. All other thicknesses are set based on the weight of the connection so as to lie between these two numbers.

At block 102, the position for each node is determined in the business problem network. In one embodiment, the business problem network utilizes a force directed layout to conduct a simulation. In this embodiment, all nodes repel each other with a force inversely proportional to the square of the distance between them. All nodes that are connected attract each other with a force directly proportional to the distance between them. Initially, all the nodes are laid out randomly. The cumulative force on each node is calculated for each frame of the visualization and the nodes are moved a distance proportional to the value of the force, in the direction of the force. The process of force calculation and node movement is conducted for every frame until the average movement of the nodes is less than one pixel. Further, the nodes are moved small distances to avoid overlaps in the labels.

At block 104, a shape of each node is determined. In one embodiment, the shape is assigned to the nodes based on characteristics of the business problem statement. For example, different shapes for different horizontals, different business types and the like can be assigned.

At block 106, the business problem network is generated using the nodes and connections. In one embodiment, the business problem network is represented like stars in the universe.

The above described business problem system may be implemented as a business problem networking tool that is configured to execute on a computing device. The business problem networking tool includes several interfaces which enable the user to interact with the various components of the business problem system. Some of the relevant interfaces are described in further detail below.

Figure 6:
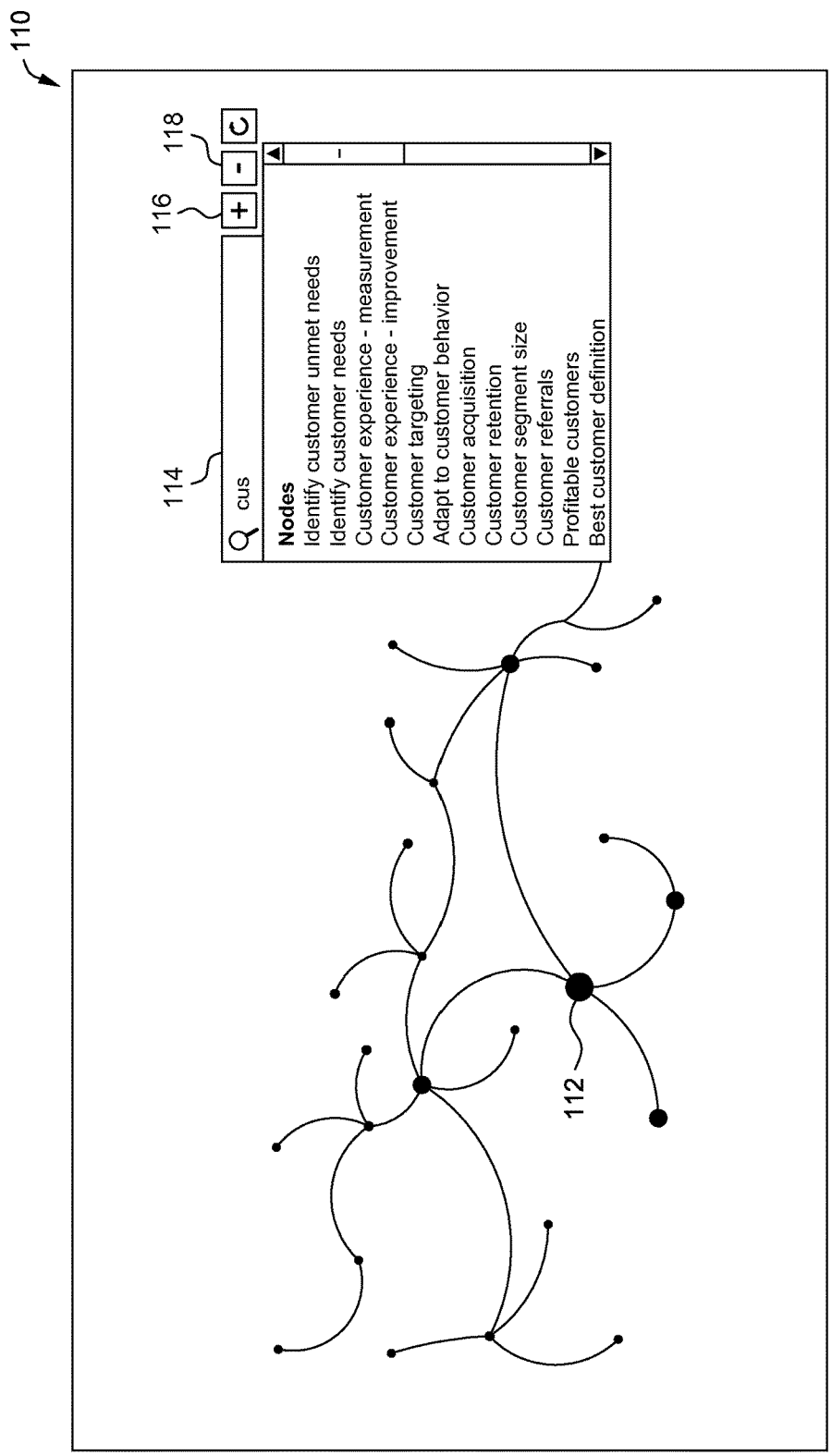
FIG. 6 is an example user interface of a business problem networking tool implemented according to aspects of the present technique.

FIG. 6 is an example user interface of a business problem networking tool implemented according to aspects of the present technique. The user interface 110 is configured to display the business problem network comprising nodes and connections. In the illustrated embodiment, the user interface 110 represents the business problem network in the form of a constellation of stars.

The user interface 110 enables a user to select a desired node (cell 112) from the nodes in the business problem network and highlight the nodes and connections associated with the selected node. The user interface 110 also includes a search field 114 configured to enable a user to provide a desired search string.

Further, the user can navigate through the business problem network using zoom in (cell 116) and zoom out (cell 118) options to visualize the nodes and connections. In addition, multiple views of the business problem network like full screen, docked view, floating view and the like are also provided to the user.

Figure 7:
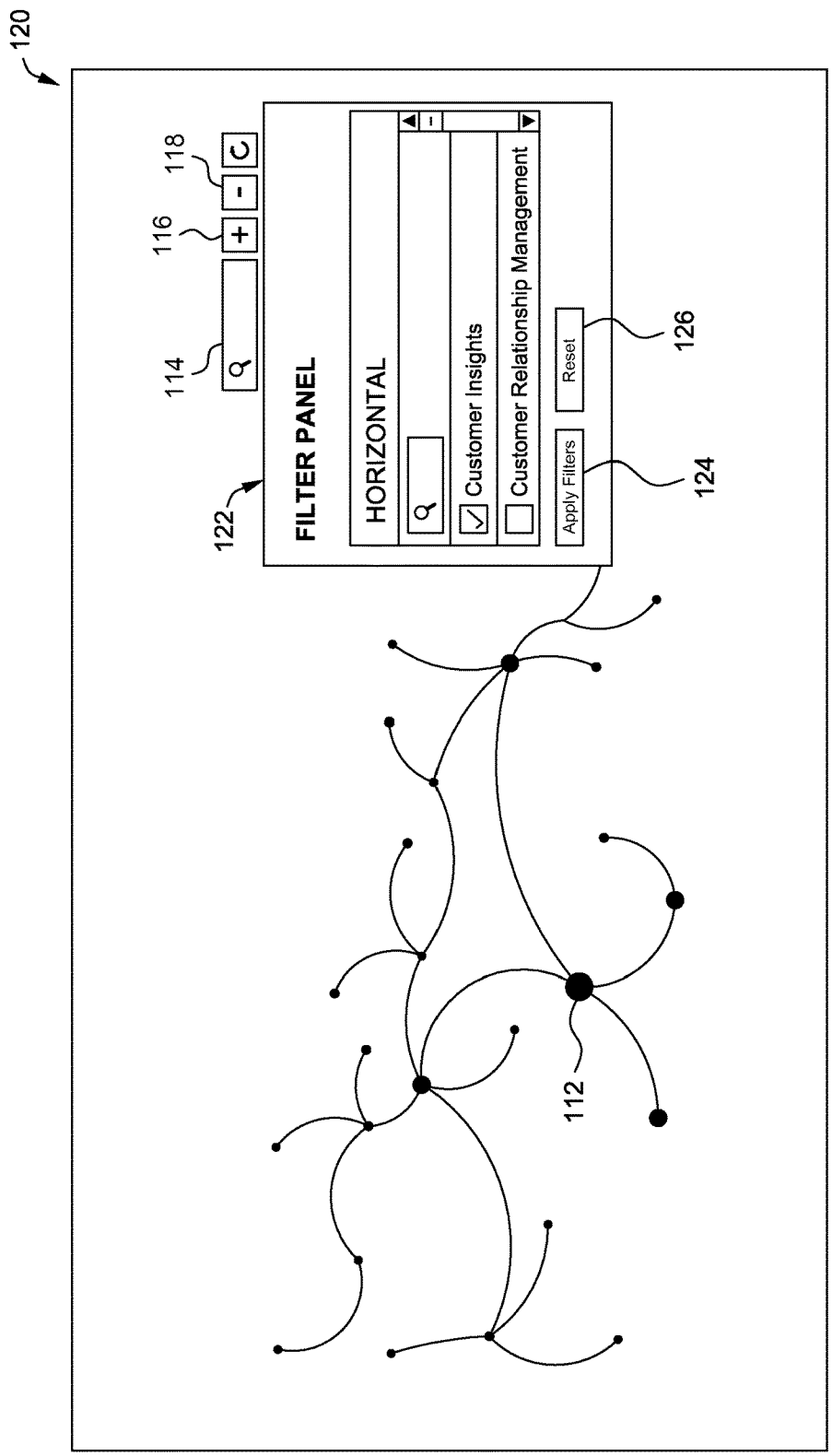
FIG. 7 is an example user interface depicting a filter in a business problem networking tool implemented according to aspects of the present technique.

FIG. 7 is an example user interface depicting filters implemented according to aspects of the present technique. The filter interface 120 includes a filter panel 122 that enables the user to select one or more filter parameters that filter the business problem statements. In the illustrated embodiment, the one or more parameters include customer insights, customer relationship management and the like. In one illustrated embodiment, the business problem statements can be filtered based on one or more parameters by selecting the "Apply Filters" tab (cell 124) or can be reset by selecting the "Reset" tab (cell 126) provided in the filter panel 122.

Figure 8:
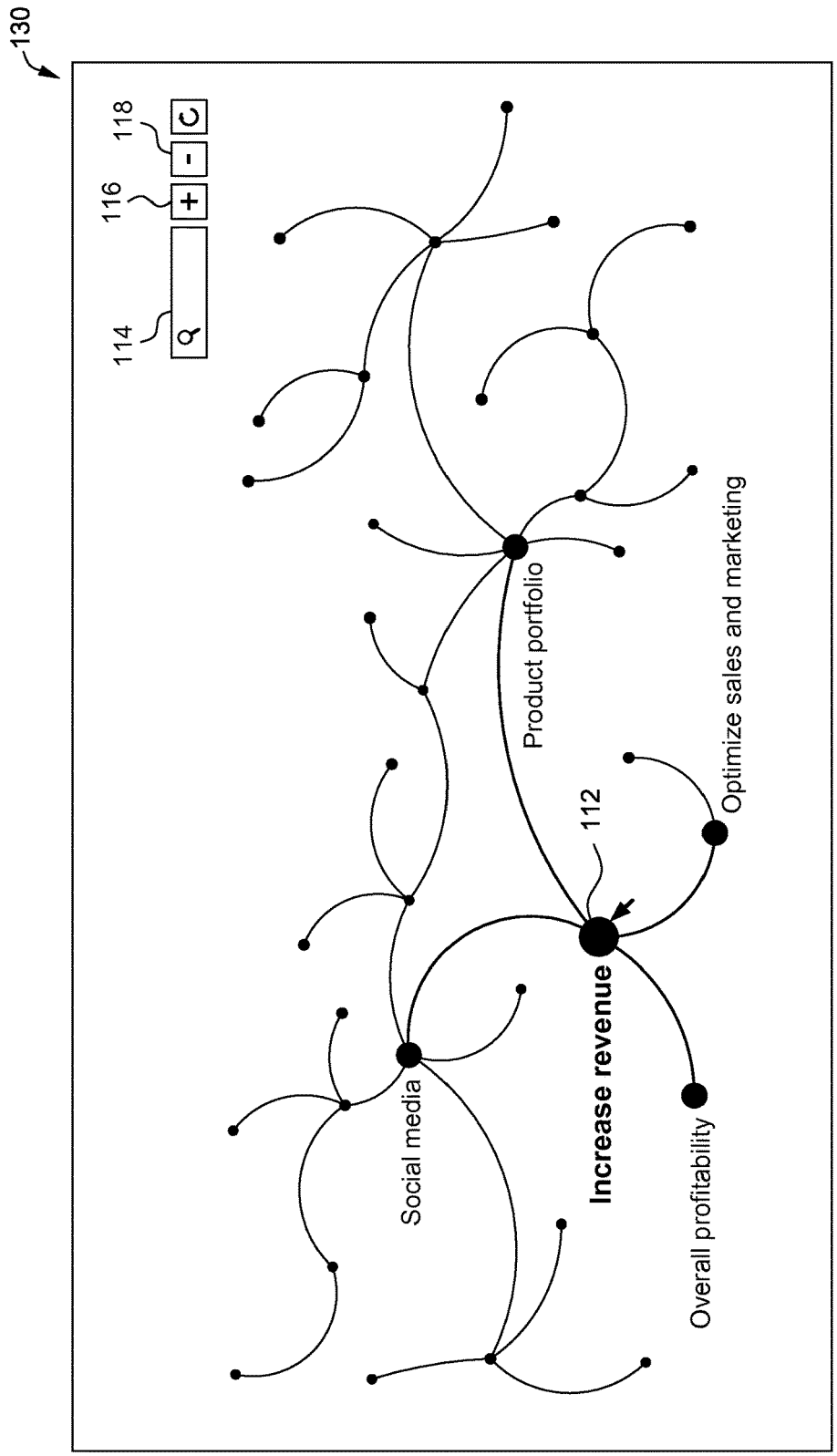
FIG. 8 is an example user interface depicting a zoom-in view of a business problem networking tool implemented according to aspects of the present technique.

FIG. 8 is an example user interface depicting a zoom-in view of a business problem network implemented according to aspects of the present technique. The zoom-in view 130 illustrates a desired node to highlight only the connections of that particular node. In the illustrated embodiment, the mouse arrow is presented over the "increase revenue" node. The various nodes connected to the selected node like "optimize sales and marketing", "product portfolio", "overall profitability" are automatically highlighted.

Figure 9:
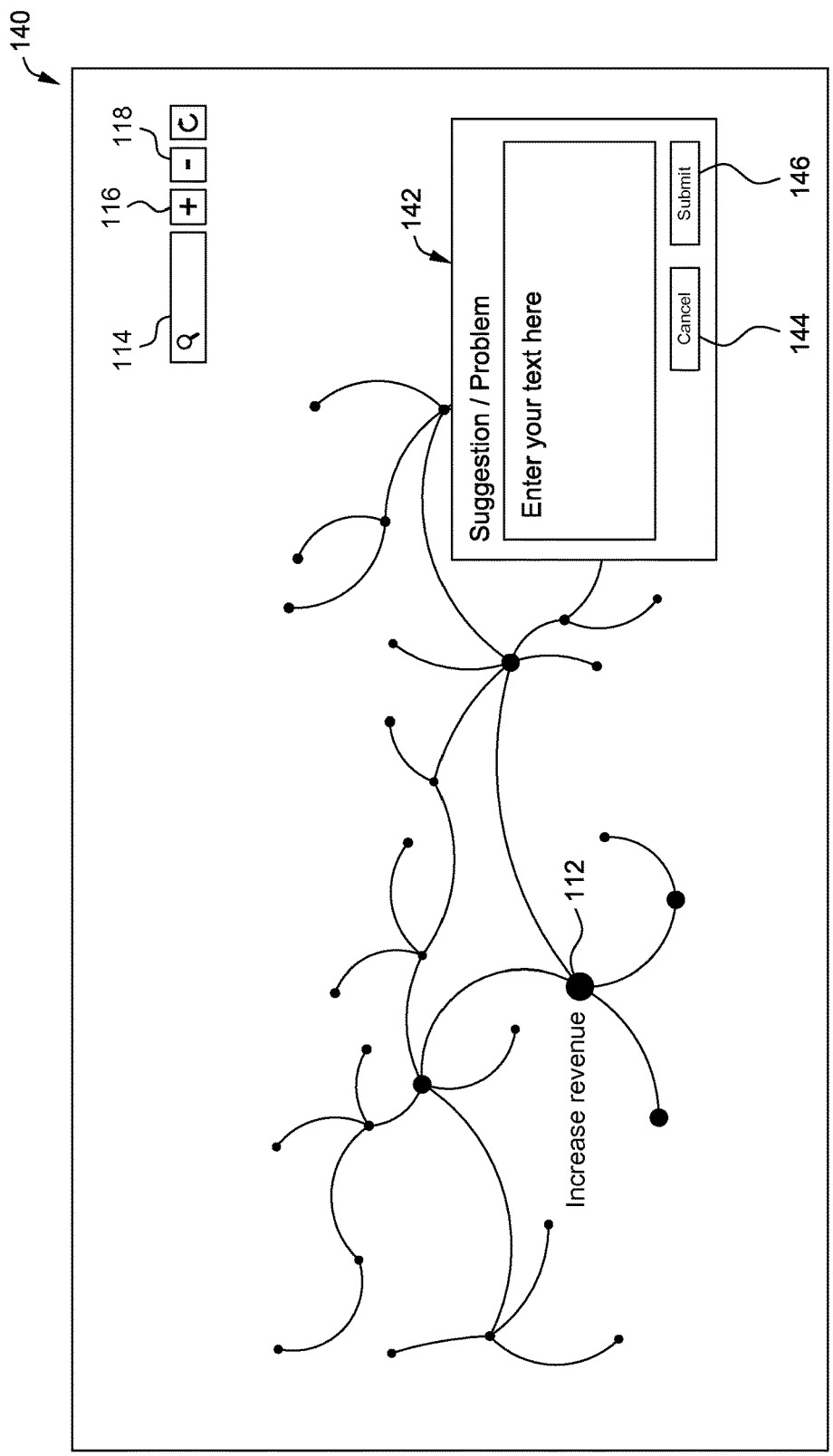
FIG. 9 is an example user interface depicting a suggestion panel of a business problem networking tool implemented according to aspects of the present technique.

FIG. 9 is an example user interface depicting a suggestion panel of a business problem networking tool implemented according to aspects of the present technique. The suggestion panel 140 includes a suggestion/problem window 142 that is used by the user to make a suggestion or report a problem to the concerned business problem networking tool administrator. The tabs "Cancel" (cell 144) and "Submit" (cell 146) provided in the suggestion panel can be used for this purpose.

FIG. 10 is an example user interface depicting a library of business problem statements that can be accessed by a business problem networking tool implemented according to aspects of the present technique. The library 150 enables the creation of a custom business problem network. The user can select multiple business problem statements available in the library (cell 150) and use them to create a new customized business problem network according to the requirement. The library 150 includes fields pertaining to import 154, export 156, new 158 and create 160 for the business problem statement. The library 150 includes fields pertaining to the details about who created (cell 178) the business problem statement (cell 162), date (cell 164), modified on which date (cell 166) and the like. The library further includes various fields pertaining to parameters related with the business problem statement like vertical 168, horizontal 170, problem type 172, business type 174, and custom category 176. Further, a "create library" tab (cell 180) is provided in the library interface for creation of a new business problem network. On invoking the action of "create library" tab (cell 180), the interface transitions to wizard interface as described below.

Figure 11:
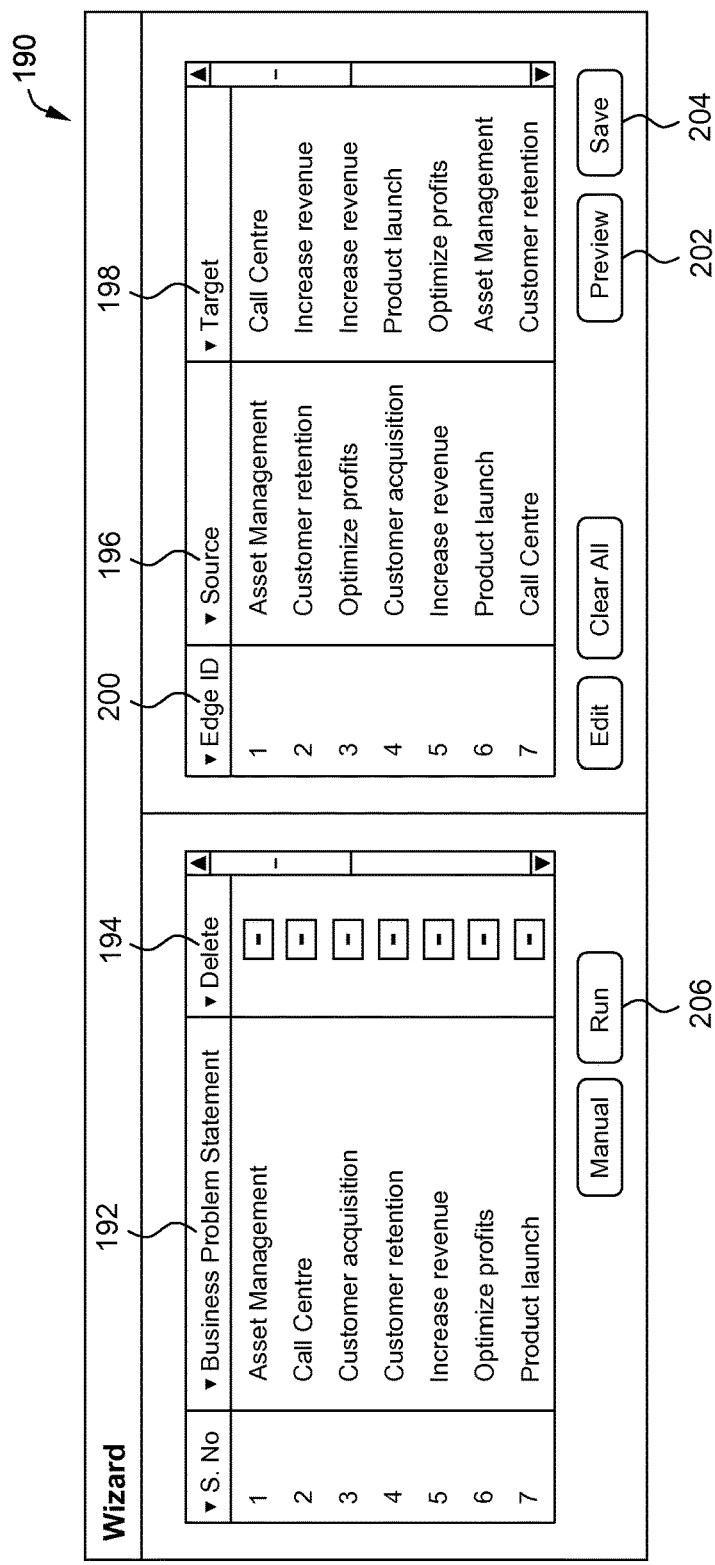
FIG. 11 is an example user interface depicting a wizard for creating a new business problem network using a business problem networking tool implemented according to aspects of the present technique.

FIG. 11 is an example user interface depicting a wizard for creating a new business problem network using a business problem networking tool implemented according to aspects of the present technique. The wizard 190 allows a user to add multiple business problem statements (cell 192) to the business problem network. The wizard 190 also allows deletion (cell 194) of undesired business problem statements from the business problem network. The wizard 190 further allows users to establish a connection between a source business problem statement (cell 196) and a target business problem statement (cell 198). The connection is identified using a unique identifier (cell 200). Further, the wizard allows the flexibility to preview 202 the business problem network before saving (204) it as described below.

Figure 12:
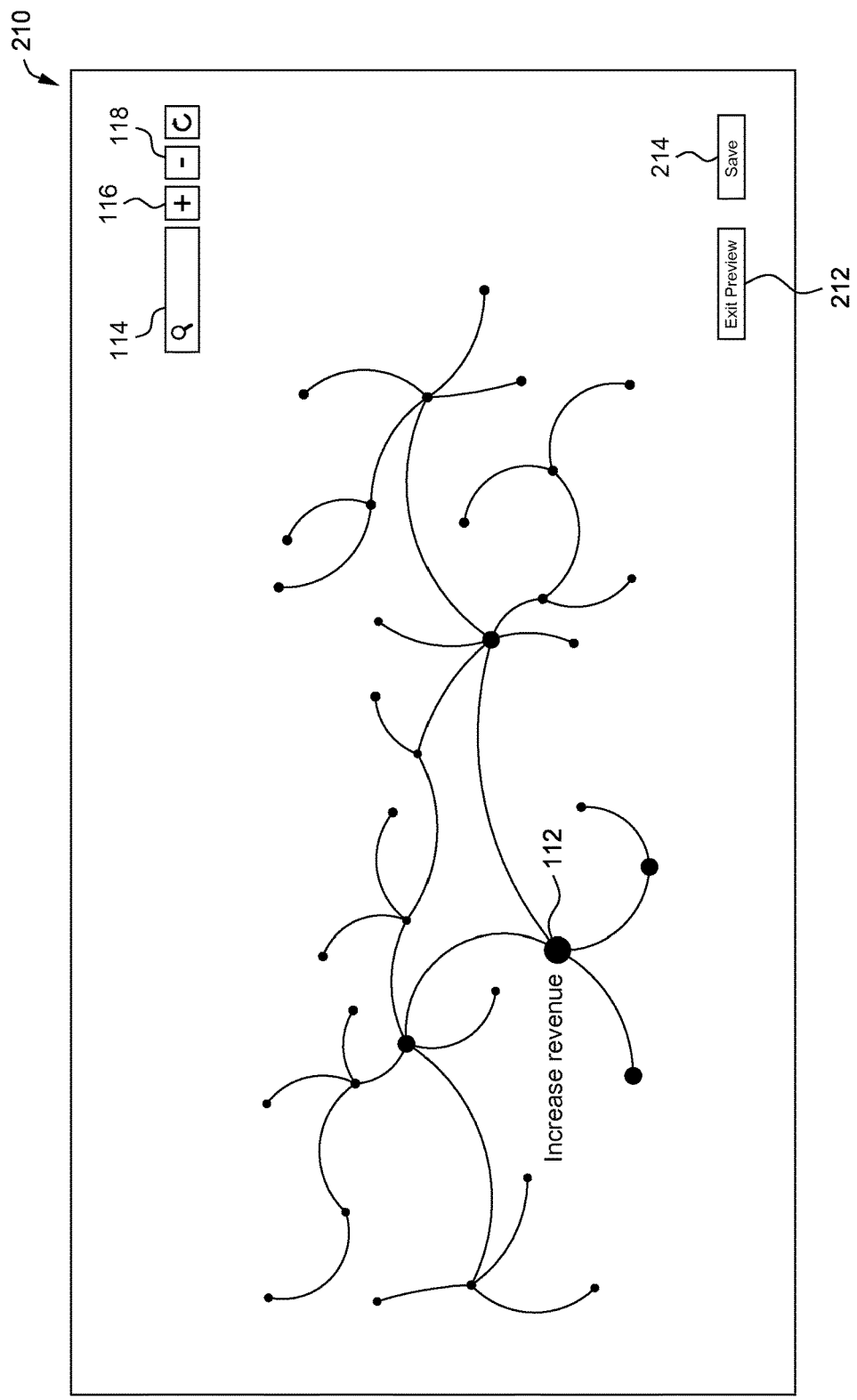
FIG. 12 is an example user interface depicting preview of a business problem network generated by a business problem networking tool implemented according to aspects of the present technique.

FIG. 12 is an example user interface depicting preview of a business problem network generated by a business problem networking tool implemented according to aspects of the present technique. The preview screen 210 includes tabs pertaining to exit preview 212 for transiting back to wizard 190 and save 214 the business problem network to the business problem repository.

The technique described above may be embodied as devices, systems, methods, and/or computer program products. The technique described above may be embodied as devices, systems, methods, and/or computer program products. Accordingly, some or all of the subject matter described above may be embodied in hardware and/or in software (including firmware, resident software, micro-code, state machines, gate arrays, etc.) Furthermore, the subject matter may take the form of a computer program product such as an analytical tool, on a computer-usable or computer-readable storage medium having computer-usable or computer-readable program code embodied in the medium for use by or in connection with an instruction execution system. In the context of this description, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

When the subject matter is embodied in the general context of computer-executable instructions, the embodiment may comprise program modules, executed by one or more systems, computers, or other devices. Generally, program modules include routines, programs, objects, components, data structures, etc. that performs particular tasks or implement particular abstract data types. Typically, the functionality of the program modules may be combined or distributed as desired in various embodiments.

Figure 13:
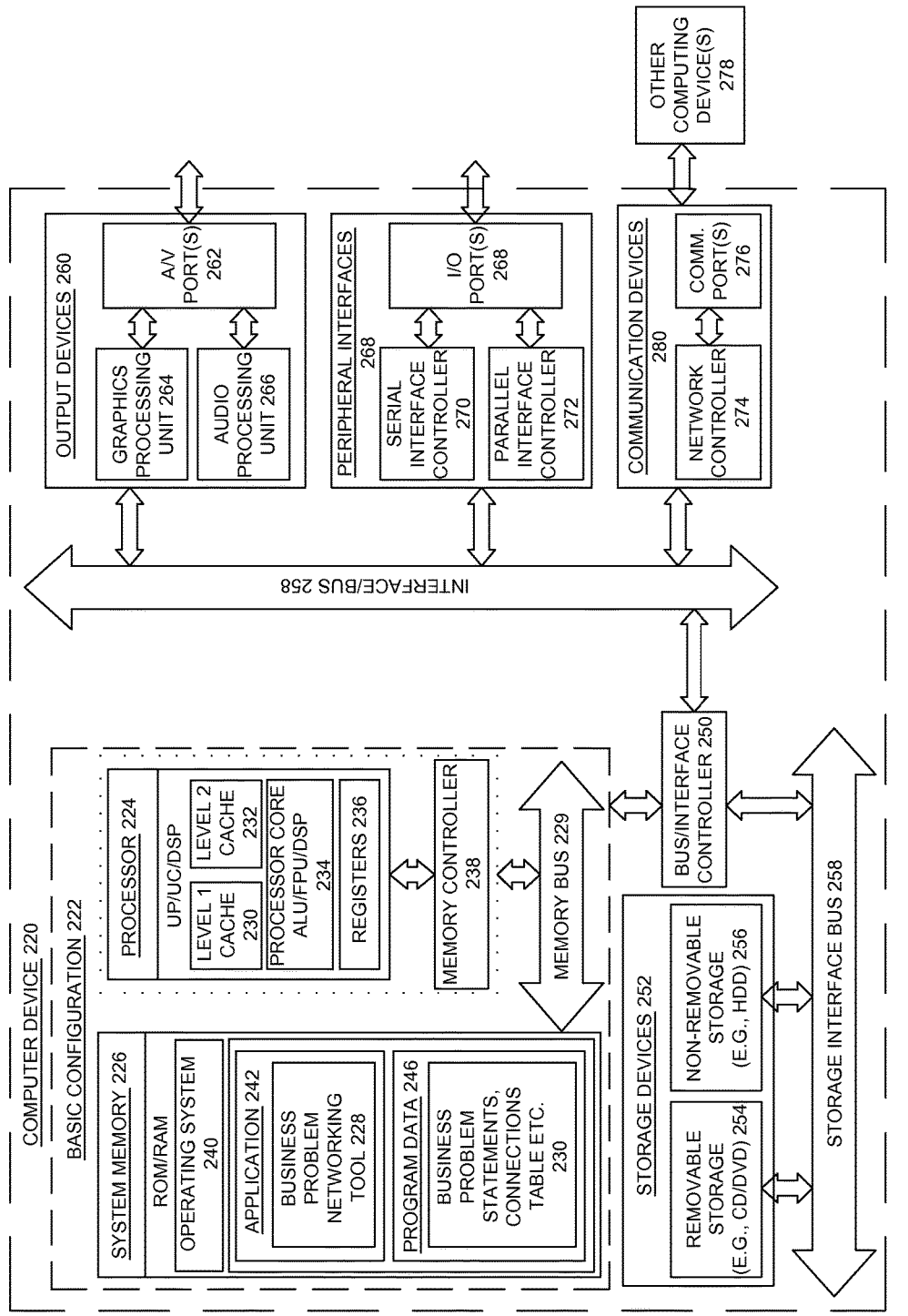
FIG. 13 is a block diagram of an example general-purpose computing device used to generate a business problem network implemented according to aspects of the present technique.

FIG. 13 is a block diagram of an example computing system 220 that is arranged for generating a business problem network using techniques described above. In a very basic configuration 222, computing system 220 typically includes one or more processors 224 and a system memory 226. A memory bus 229 may be used for communicating between processor 224 and system memory 226.

Depending on the desired configuration, processor 224 may be of any type including but not limited to a microprocessor (µP), a microcontroller (µC), a digital signal processor (DSP), or any combination thereof. Processor 224 may include one or more levels of caching, such as a level one cache 230 and a level two cache 232, a processor core 234, and registers 236. An example processor core 234 may include an arithmetic logic unit (ALU), a floating point unit (FPU), a digital signal processing core (DSP Core), or any combination thereof. An example memory controller 238 may also be used with processor 224, or in some implementations memory controller 238 may be an internal part of processor 224.

Depending on the desired configuration, system memory 226 may be of any type including but not limited to volatile memory (such as RAM), non-volatile memory (such as ROM, flash memory, etc.) or any combination thereof. System memory 226 may include an operating system 240, a business problem networking tool 242 and a program data 244 comprising business problem statements, connections table, etc.

Business problem networking tool 228 is configured to identify and visualize one or more interrelationships occurring amongst a plurality of business problem statements stored in the program data 246. Business problem statements, connection tables, etc. generally referenced by reference numeral 230 is considered as program data. This described basic configuration 222 is illustrated in FIG. 13 by those components within the inner dashed line.

Computing system 220 may have additional features or functionality, and additional interfaces to facilitate communications between basic configuration 222 and any required devices and interfaces. For example, a bus/interface controller 246 may be used to facilitate communications between basic configuration 222 and one or more data storage devices 248 via a storage interface bus 258. Data storage devices 252 may be removable storage devices 254, non-removable storage devices 256, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 226, removable storage devices 254 and non-removable storage devices 256 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing system 220. Any such computer storage media may be part of computing system 220.

Computing system 220 may also include an interface bus 258 for facilitating communication from various interface devices (e.g., output devices 260, peripheral interfaces 268, and communication devices 280) to basic configuration 222 via bus/interface controller 250. Example output devices 260 include a graphics processing unit 264 and an audio processing unit 266, which may be configured to communicate to various external devices such as a display or speakers via one or more A/V ports 262.

Example peripheral interfaces 268 include a serial interface controller 270 or a parallel interface controller 272, which may be configured to communicate with external devices such as input devices (e.g., keyboard, mouse, pen, voice input device, touch input device, etc.) or other peripheral devices (e.g., printer, scanner, etc.) via one or more I/O ports 268. An example communication device 280 includes a network controller 274, which may be arranged to facilitate communications with one or more other business computing devices 278 over a network communication link via one or more communication ports 276.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing system 220 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. It may be noted that computing system 220 may also be implemented as a personal computer including both laptop computer and non-laptop computer configurations.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated and described herein, many modifications and changes will occur to those skilled in the art. It is, therefore, to be understood that the appended claims are intended to cover all such modifications and changes as fall within the true spirit of the invention.

What is claimed is:

1. A system for identifying and visualizing one or more interrelationships occurring amongst a plurality of business problems, the system comprising:

a business problem repository configured to store a plurality of business problem statements, wherein each business problem statement comprises a plurality of components;

a connection engine coupled to the business problem repository and configured to determine one or more connections for each business problem statement among the plurality of business problem statements by comparing pairs of business problem statements, including applying a one-to-one comparison scheme to compare respective components associated with each pair of business problem statements, generate component connection scores for each comparison based on a degree of matching between the respective components being compared, generate a cumulative connection score for each of the one or more connections for each business problem statement by adding the component connection scores, wherein the cumulative connection score indicates a strength of a connection between a pair of business problem statements, and assign a weight to each of the one or more connections based on a difference between the cumulative connection score and a threshold value;

a connections repository coupled to the connection engine and configured to store the one or more connections and corresponding connection scores and weights for each of the one or more connections associated with each business problem statement in one or more connection tables;

a categorization engine coupled to the business problem repository and the connections repository and configured to assign a rank to each business problem statement based on frequency scores calculated for the plurality of business problem statements using the one or more connection tables, and group each business problem statement into a cluster based on cluster values and a gain value calculated for the plurality of business problem statements;

a visualization engine coupled to the connections repository and configured to generate a visual representation of a business problem network, wherein the business problem network comprises a plurality of nodes coupled to each other in an interconnected pattern using a plurality of connections, each node representing a single business problem statement, each node being assigned a size based on the rank assigned to the single business problem statement, a color based on the cluster into which the single business problem statement is grouped, and position coordinates, and each connection having a thickness based on the weight assigned thereto; and a display device coupled to the visualization engine and configured to display the visual representation of the business problem network to a user via a graphical user interface, wherein the graphical user interface enables the user to select a node of interest for solving a specific business problem from among the plurality of nodes in the business problem network, and automatically highlights any nodes and connections associated with the selected node, wherein the visual representation of the business problem network enables the user to visualize interrelationships, connection strength, and relative importance among the plurality of business problem statements based on the plurality of connections, the size, the color, and the position coordinates assigned to each node, and the thickness of each connection.

2. The system of claim 1, wherein the plurality of components for each business problem statement include any of a name or a title of a business problem, a description of the business problem, one or more keywords associated with the business problem, a situation in which the business problem occurs, one or more key questions related to the business problem, one or more complications arising in defining the business problem, a desired state of the business problem, one or more factors that directly or indirectly contribute to defining the business problem, a plurality of hypotheses associated with the business problem, and combinations thereof, and each business problem statement is tagged with parameters including any of vertical, horizontal, business type, problem type, custom category, other relevant metrics, and combinations thereof.

3. The system of claim 1, wherein the connection engine is configured to attribute a direction to the connection between two business problem statements using a directionality table.

4. The system of claim 3, wherein the one or more connection tables further comprise the direction for each connection associated with each business problem statement.

5. The system of claim 1, wherein the visualization engine further comprising a search engine configured to search the plurality of business problem statements based on search string provided by the user.

6. The system of claim 1, wherein the visualization engine is further configured to filter the plurality of business problem statements based on one or more parameters selected by the user.

7. The system of claim 1, wherein the visualization engine is further configured to generate a preview of the plurality of business problem statements stored in the business problem repository.

8. The system of claim 1, wherein the visualization engine is further configured to download the plurality of business problem statements stored in the business problem repository to a specified computing device.

9. A business problem networking tool for identifying and visualizing one or more interrelationships occurring amongst a plurality of business problems, the business problem networking tool comprising:

at least one memory configured to store computer-readable instructions and program data including a plurality of business problem statements and one or more connection tables, wherein each business problem statement comprises a plurality of components; and one or more processors configured to execute the computer-readable instructions to determine one or more connections for each business problem statement among the plurality of business problem statements by comparing pairs of business problem statements, including applying a one-to-one comparison scheme to compare respective components associated with each pair of business problem statements;

generate component connections scores for each comparison based on a degree of matching between the respective components being compared;

generate a cumulative connection score for each of the one or more connections for each business problem statement by adding the component connection scores, wherein the cumulative connection score indicates a strength of a connection between a pair of business problem statements;

assign a weight to each of the one or more connections based on a difference between the cumulative connection score and a threshold value;

store the one or more connections and corresponding connection scores and weights for each of the one or more connections associated with each business problem statement in the one or more connection tables;

assign a rank to each business problem statement based on frequency scores calculated for the plurality of business problem statements using the one or more connection tables;

group each business problem statement into a cluster based on cluster values and a gain value calculated for the plurality of business problem statements;

generate a visual representation of a business problem network comprising a plurality of nodes coupled to each other in an interconnected pattern using a plurality of connections, each node representing a single business problem statement among a plurality of business problem statements, each node being assigned a size based on the rank assigned to the single business problem statement, a color based on the cluster into which the single business problem statement is grouped, and position coordinates, and each connection having a thickness based on the weight assigned thereto;

generate an interactive user interface configured to display the visual representation of the business problem network to a user, enable the user to select a node of interest representing a business problem statement for solving a specific business problem from among the plurality of nodes in the business problem network, and automatically highlight any nodes and connections associated with the selected node, wherein the visual representation of the business problem network enables the user to visualize interrelationships, connection strength, and relative importance among the plurality of business problem statements based on the plurality of connections, the size, the color, and the position coordinates assigned to each node, and the thickness of each connection;

generate a filter interface configured to enable the user to filter the plurality of business problem statements based on one or more parameters selected by the user; and generate a library configured to enable the user to search the plurality of business problem statements based on a search string provided by the user.

10. The business problem networking tool of claim 9, wherein the interactive user interface is configured to enable the user to create a new business problem network using a plurality of business problem statements stored in a business problem repository.

11. The business problem networking tool of claim 9, wherein the interactive user interface is further configured to display the visual representation of the business problem network in the form of a constellation of stars.

12. The business problem networking tool of claim 9, wherein the interactive user interface is configured to enable the user to examine a plurality of components associated with the selected business problem statement.

13. The business problem networking tool of claim 10, wherein the interactive user interface is further configured to generate a preview of the plurality of business problem statements stored in the business problem repository.

14. The business problem networking tool of claim 9, wherein the library is configured to be updated at regular intervals with a plurality of new business problem statements created by a plurality of users.

\* \* \* \* \*